(12) United States Patent
Levin et al.

(10) Patent No.: US 7,806,438 B2
(45) Date of Patent: Oct. 5, 2010

(54) FRAME STRUCTURE AND A METHOD FOR MANUFACTURING A FRAME STRUCTURE

(75) Inventors: Göran Levin, Hisings-Kärra (SE); Bengt Kölqvist, Partille (SE)

(73) Assignee: Volvo Lastvagnar AB, Göteborg (SE)

( * ) Notice: Subject to any disclaimer, the term of this patent is extended or adjusted under 35 U.S.C. 154(b) by 356 days.

(21) Appl. No.: 12/094,062

(22) PCT Filed: Nov. 8, 2006

(86) PCT No.: PCT/SE2006/011269

§ 371 (c)(1),
(2), (4) Date: May 16, 2008

(87) PCT Pub. No.: WO2007/061353

PCT Pub. Date: May 31, 2007

(65) Prior Publication Data

US 2010/0219663 A1   Sep. 2, 2010

(30) Foreign Application Priority Data

Nov. 25, 2005   (SE) .................................. 0502590

(51) Int. Cl.
*B62D 21/03* (2006.01)
(52) U.S. Cl. .................. 280/781; 280/790; 29/897.2
(58) Field of Classification Search ............. 280/781, 280/786, 790, 800, 789; 29/897.2
See application file for complete search history.

(56) References Cited

U.S. PATENT DOCUMENTS

| | | | |
|---|---|---|---|
| 2,277,615 A | | 3/1942 | Townsend |
| 2,277,616 A | * | 3/1942 | Townsend ................... 52/838 |
| 3,612,569 A | | 10/1971 | Marinelli |
| 4,576,398 A | | 3/1986 | Kinne |
| 5,725,247 A | * | 3/1998 | Nilsson et al. ............ 280/781 |

FOREIGN PATENT DOCUMENTS

| | | |
|---|---|---|
| FR | 2370618 A1 | 6/1978 |
| WO | 9510442 A1 | 4/1995 |

OTHER PUBLICATIONS

International Search Report from corresponding International Application No. PCT/SE2006/001268.

* cited by examiner

*Primary Examiner*—Paul N Dickson
*Assistant Examiner*—Drew Brown
(74) *Attorney, Agent, or Firm*—WRB-IP LLP

(57) ABSTRACT

A frame structure for a load-carrying vehicle includes at least one frame member extending generally in the longitudinal direction of the vehicle, the frame member being divided into an upper section and a lower section by a slit extending at least along a predetermined section of the frame member. The slit is shaped so as to allow a forced displacement of the upper section to a position in which it extends generally parallel to the lower section and in a manner so that the frame member is narrower along a section generally corresponding to the length of the slit, as compared with the remaining section of the frame member. A method for manufacturing a frame structure is also disclosed.

9 Claims, 5 Drawing Sheets

FRAME STRUCTURE AND A METHOD FOR MANUFACTURING A FRAME STRUCTURE

BACKGROUND AND SUMMARY

The present invention relates to a frame structure for a load-carrying vehicle and comprising at least one frame member extending generally in the longitudinal direction of said vehicle, said frame member being divided into an upper section and a lower section by means of a slit extending at least along a predetermined section of said frame member.

The invention also relates to a method for manufacturing a frame structure for a load-carrying vehicle and comprising: providing at least one frame member extending generally in the longitudinal direction of said vehicle, and dividing said frame member into an upper section and a lower section by means of a slit extending at least along a predetermined section of said frame member.

In the field of vehicles, in particular commercial load-carrying vehicles, there is a demand for a high capacity as regards loading of cargo, for example in the form of a large cargo compartment in the vehicle. Furthermore, today's load-carrying vehicles normally comprise a frame structure with two elongated frame members in the form of U-beams, which extend in the longitudinal direction of the vehicle. The cargo compartment of the vehicle is positioned above the frame structure. In order to achieve an optimum loading capacity of the vehicle, it is advantageous to keep the height of the frame structure as low as possible in order to maximize the height, and consequently the total volume, of the cargo compartment. In this regard, it should also be noted that legislation exists in many countries which defines a maximum height of the entire vehicle above the road.

Consequently, a general problem which concerns load-carrying vehicles is the need to optimize the available cargo space in such vehicles. This problem can be solved by providing certain modifications of the frame structure of the vehicle. For example, certain sections of a frame structure can be replaced by frame beams having lesser height than the remaining parts of the frame structure. This means that the available height for the cargo compartment is increased.

However, a problem with such modifications is that, according to prior art, they involve manufacturing processes such as welding, which is considered to be a time-consuming and consequently relatively costly step during such a manufacturing process. If modifications of the above-mentioned type should be carried out, there is consequently a need to avoid such costly manufacturing procedures.

It is desirable to provide a frame structure and a method for manufacturing a frame structure, by means of which the above-mentioned problem can be solved and which in particular gives a possibility to obtain an increased cargo load capacity for the vehicle in question.

In a frame structure according to an aspect of the invention, said slit is shaped so as to allow a forced displacement of said upper section to a position in which it extends generally parallel to said lower section and in a manner so that said frame member is narrower along a section generally corresponding to the length of the slit, as compared with the remaining section of said frame member.

A method for manufacturing a frame structure according to an aspect of the invention comprises shaping said slit and providing a forced displacement of said upper section in a manner so that the upper section assumes a position in which it extends generally parallel to said lower section and in a manner so that said frame member is narrower along a section generally corresponding to the length of the slit, as compared with the remaining section of said frame member.

By means of the present invention, certain advantages are accomplished. For example, it can be noted that the invention provides an effective yet simple solution to the problem of increasing the loading capacity of a load-carrying vehicle, while still providing a sufficiently strong frame structure for the vehicle. Also, the invention can be implemented by means of a manufacturing at a relatively low cost.

BRIEF DESCRIPTION OF DRAWINGS

In the following, the invention will be described with reference to the appended drawings, wherein.

DETAILED DESCRIPTION

Figure 1:
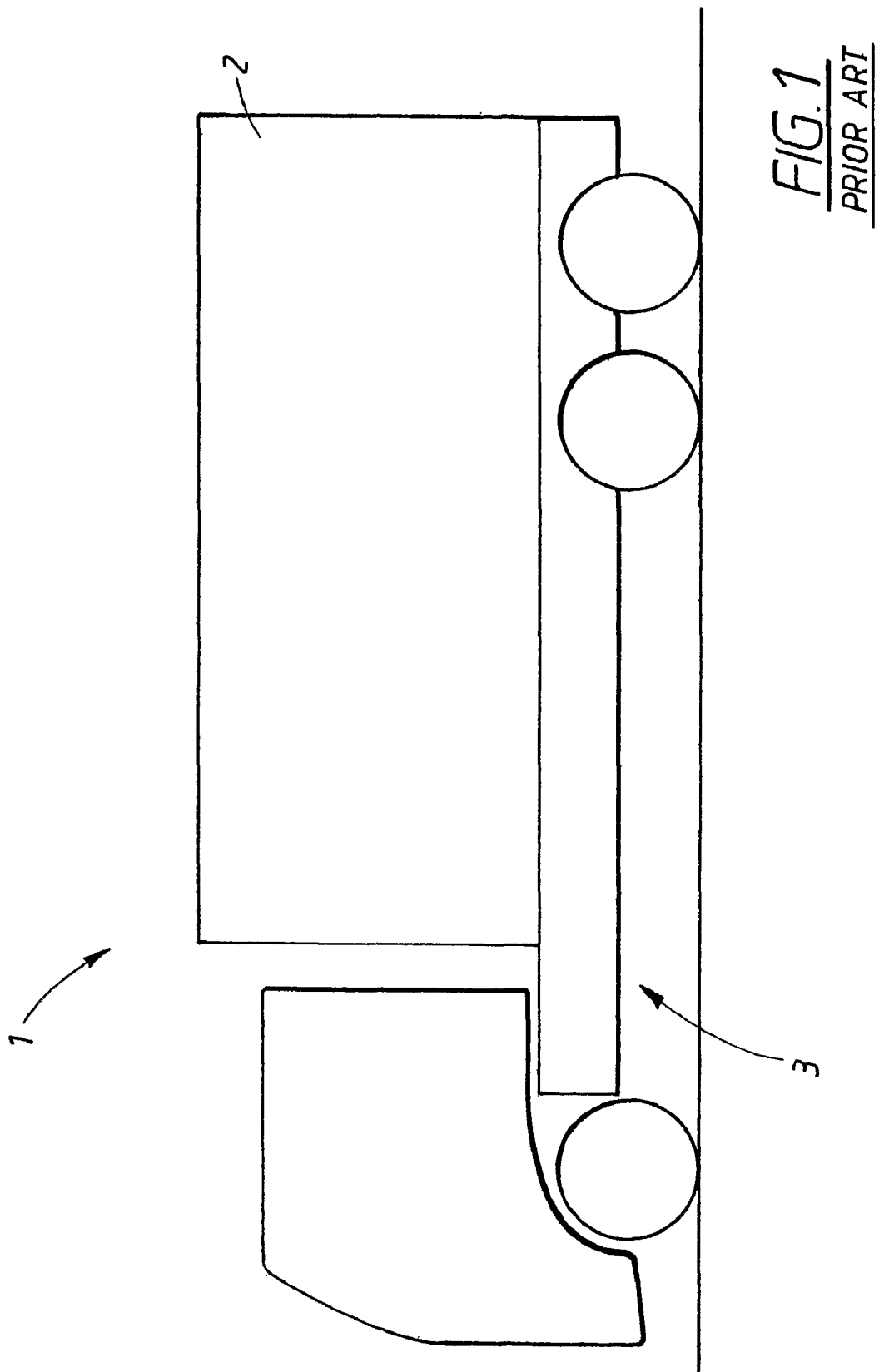
FIG. 1 is a simplified side view of a load-carrying vehicle with a frame structure according to prior art.

FIG. 1 shows a simplified side view of a load-carrying vehicle 1 according to the prior art. The vehicle 1 is provided with a cargo compartment 2 for carrying a certain cargo, in a conventional manner. The vehicle 1 as shown is also provided with a frame structure 3 in a manner which is common in today's load-carrying vehicles. The frame structure 3 forms a chassis for the vehicle and is also adapted for attaching certain pieces of equipment, such as wheel axles, suspension devices, fuel tank etc. As is previously known as such, the frame structure 3 comprises two elongated frame members which are suitably constituted by so-called U-beams.

Figure 2:
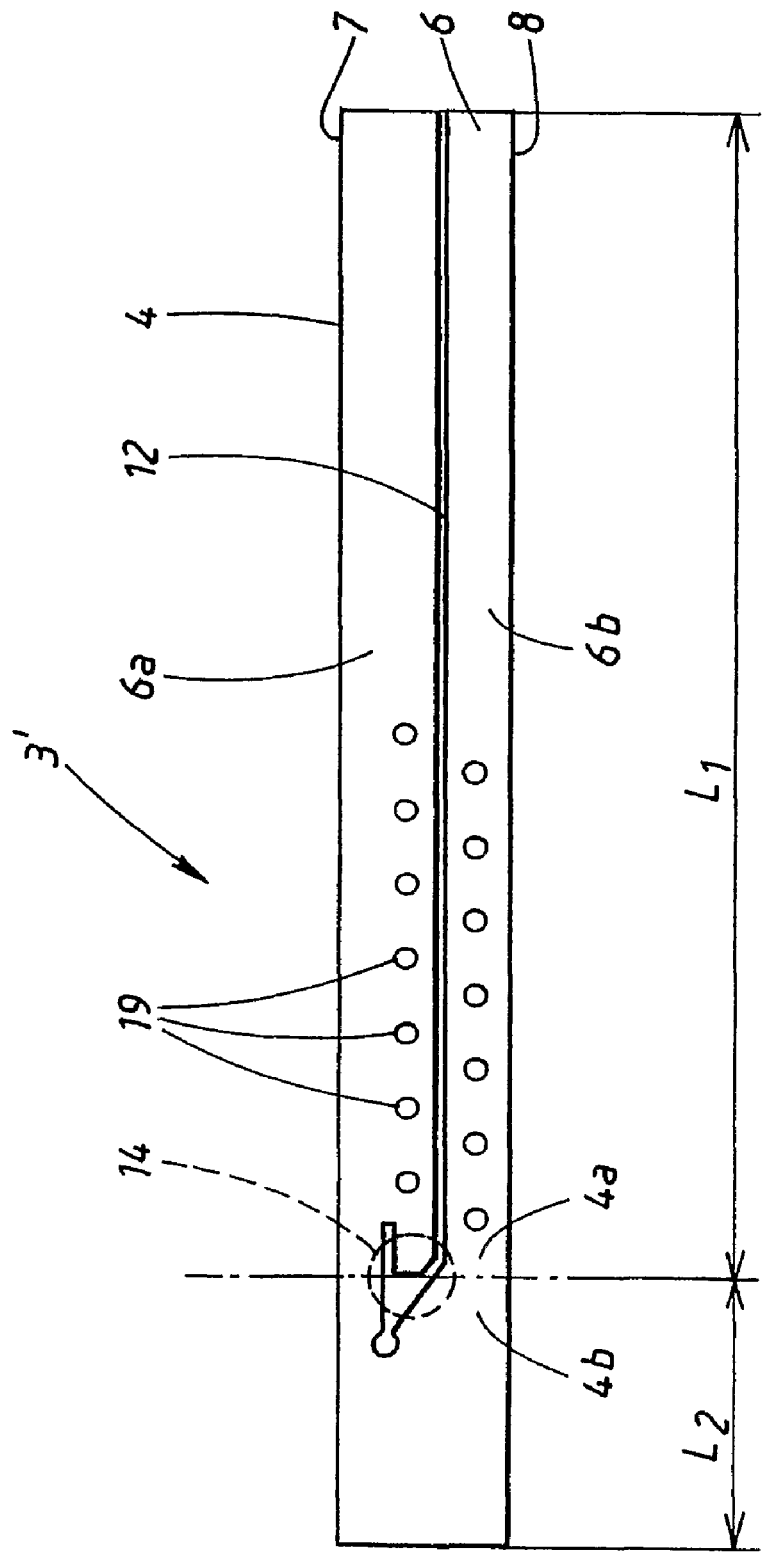
FIG. 2 shows a side view of a frame structure according to the present invention, in a first condition in which it is unassembled.
Figure 3:
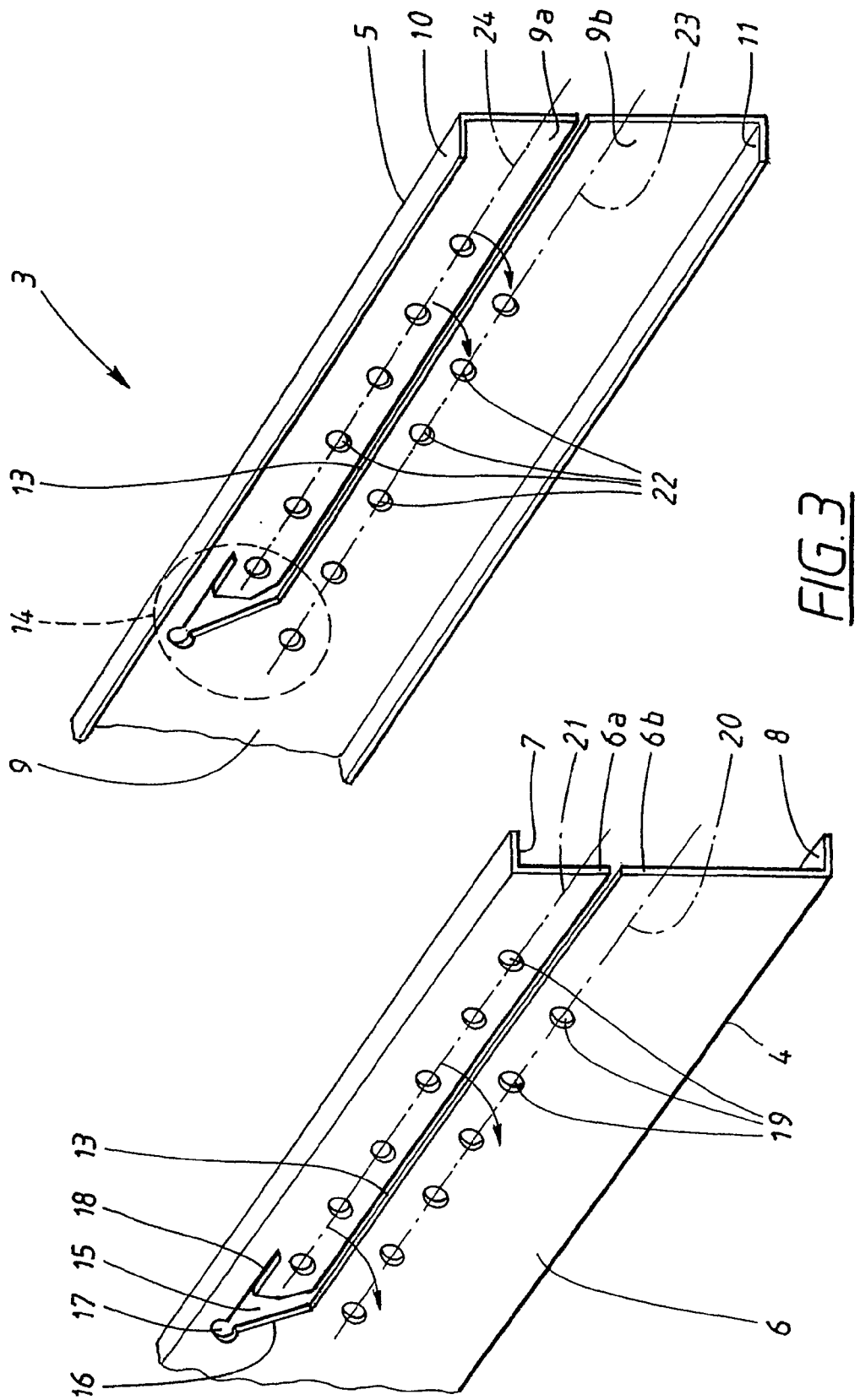
FIG. 3 is a perspective view of a section of the frame structure according to the invention, in said first condition, and shown in greater detail than FIG. 2.

FIG. 2 shows a side view of a frame structure 3' according to the present invention, taken from a view which corresponds to the view shown in FIG. 1. The frame structure 3' comprises two elongated frame members of which a first frame member 4 is shown in FIG. 2 and a second frame member extends in a parallel manner with respect to the first frame member 4. For this reason, the second frame member is not visible in FIG. 2. With reference to FIG. 3 however, a perspective view of a particular section of the frame structure 3' according to the invention is shown, in which both the first frame member 4 and the second frame member 5 are shown in a more detailed manner as compared with FIG. 2.

With reference to FIGS. 2 and 3, it can be noted that the two frame members 4, 5 are designed in an analoguous manner, and are preferably constituted by U-beams having the "opening" of the U facing towards one another. Consequently, the first frame member 4 comprises a web 6, an upper flange 7 and a lower flange 8. The second frame member 5 also comprises a web 9, an upper flange 10 and a lower flange 11. Each frame member 4, 5 according to the invention is partly divided by means of a slit 12, 13 which extends along a certain part of its length, generally in the longitudinal direction of said frame member 4, 5. Consequently, each of these two slits 12, 13 extends in a direction which is generally parallel to the longitudinal direction of the vehicle 1. The slits 12, 13 are suitably formed by means of a plasma cutting process, which is a method which is previously known as such.

It should be noted that FIGS. 2 and 3 show the frame structure 3' in a condition in which has not yet been formed in accordance with the principles of the invention. Consequently, these drawings show a first, unassembled, condition of the frame structure 3', i.e. before it has been assembled so as to assume its final condition. The manner in which the frame structure 3' is formed according to its final condition will be described in greater detail below with particular reference to FIGS. 4 and 5.

Referring to FIGS. 2 and 3, the slits 12, 13 preferably extend from the rear end of each frame member 4, 5 and to a predetermined position of the frame structure 3 more close to the front of the vehicle. This predetermined position is indicated by reference numeral 14. As indicated in FIG. 2, the length $L_1$ from said position 14 and rearwards along each frame member 4, 5 and to the end section of each frame member 4, 5, corresponds to a certain section 4a of the first frame member 4 in which there is a desire to decrease the height of each frame member 4, 5. In other words, the frame members 4, 5 will be narrower along said section 4a, as compared with the remaining section 4b of the frame structure 3'. By lowering the frame structure 3' in this manner, from a point starting at said position 14 and to the end of the frame structure 3', there will be a possibility of increasing the cargo space of the vehicle 1, assuming that the total height of the vehicle in question is maximized to a certain magnitude. As indicated in FIG. 2, the remaining section 4b of the first frame member 4 is of a certain length L2 and will maintain its original height.

In the following, it will be described how the frame structure 3' according to the invention can be formed so as to assume its final, assembled condition. With reference to FIG. 3 and in particular the first frame member 4, it can be noted that the slit 12, which extends lengthwise along the web 6 of said first frame member 4, terminates in a cut-out section 15. More precisely, this cutout section 15 is obtained by means of an inclined cut 16 which starts from the slit 12 and to a hole-shaped element 17 and a further straight cut 18 which extends towards the rear of the first frame member 4, generally parallel to the slit 13. The cut-out section 15 is suitably formed by means of plasma cutting in a manner which is similar to the forming of the slits 12, 13.

Consequently, the cut-out section 15 defines an area which corresponds to the above-mentioned position 14, see FIG. 2, and which serves as a "hinge" or pivot point. This pivot point allows an upper web section 6a, i.e. the part of the web 6 which is situated above the slit 12, to be displaced by pressing it down in a direction towards a lower web section 6b, i.e. towards the part of the web 6 which is below the slit 12. During this manoeuvre, the above-mentioned predetermined section 4a of the upper web section 6a is allowed to be moved in a generally pivoting manner about the position 14 of the cutout section 15. The length $L_1$ of this predetermined section 4a is determined by the position 14 of the cut-out section 15.

Figure 4:
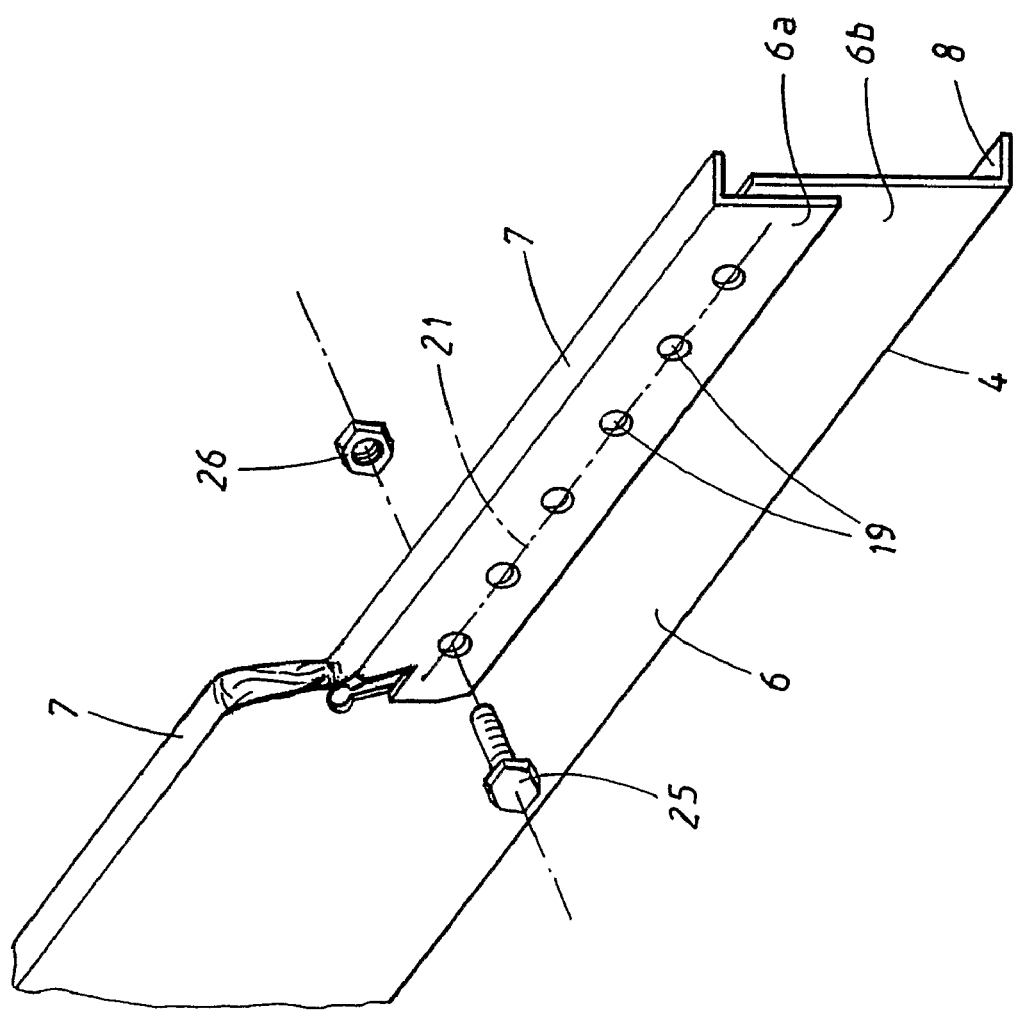
FIG. 4 is a further perspective view of a section of a frame in said frame structure according to the invention, but in a second assembled condition.

According to the shown embodiment, the upper web section 6a will finally assume a position in which it extends generally parallel to the lower web section 6b, but at a lower height than its original position. This final condition of the frame structure 3' is shown in FIG. 4, which is a perspective view generally corresponding to FIG. 3 but showing the frame structure 3' according to the invention in its final, assembled, condition. In this position, the upper flange 7 in the upper web section 6a will be lower than the upper flange 7 in the remaining portion 4b of the first frame member 4. Also, it can be noted that the upper web section 6a will be generally parallel to the lower web section 6b since the upper flange 7 will reach, and rest against, the upper edge of the lower web section 6b. During this re-positioning, the upper web section 6a will preferably be positioned on the outside of the lower web section 6b.

The purpose and function of the invention with regard to the first frame member 4 is equivalent to that of the second frame member 5. This means that the upper web section 9a of the second frame member 5 will also be displaced towards the lower web section 9b so as to assume a position in which it will be lower along a section from the position 14 and rearwards than in its remaining section ahead of said position 14. The dimensions of the first frame member 4 and the second frame member 5 are chosen so that the upper flanges 7, 10 preferably extend along a common horizontal plan.

With reference to FIG. 3 again, it can be noted that, according to the preferred embodiment, the web 6 of the first frame member 4 is provided with a number of holes 19 which are arranged in two rows extending generally along the longitudinal direction of the web 6, with one row extending on each side of the slit 12. In other words, the holes 19 are arranged along a first row in the upper web section 6a and along a second row in the lower web section 6b. The two rows are preferably arranged along two imaginary lines which are generally parallel to each other, i.e. a lower line 20 and an upper line 21 as indicated in FIG. 3.

In a corresponding manner, the second frame member 5 is provided with two rows of holes 22, which are arranged along a lower line 23 and an upper line 24.

The lines 20, 21 of holes 19 in the first frame member 4 are arranged in a manner so that the holes along the upper line 21 are positioned in an offset manner in relation to the corresponding holes along the lower line 20. The reason for this positioning is that, as mentioned above, the upper web section 6a is intended to be displaced by means of a combined pressing and pivoting movement, down towards the lower web section 6b, during assembly. This procedure is carried out in a manner in which the upper web section 6a is guided in a pivoting manner generally about the position 14 as shown in FIGS. 2 and 3 and so as to assume the position shown in FIG. 4, i.e. guided about an imaginary pivoting axis extending generally transverse to the longitudinal direction of the vehicle and through the cut-out section 15 shown in FIG. 3. During this re-positioning of the upper web section 6a, the holes along the upper line 21 will be displaced both in the vertical direction and horizontal direction, as indicated in a schematical manner by means of arrows in FIG. 3.

The result of this pressing and pivoting displacement of the upper web section 6a is shown in FIG. 4. The holes along the upper line 21 will then assume positions in which each hole is aligned with a corresponding hole along the lower line 20. This means that all the holes 19 along the two lines 20, 21 (of which the lower line 20 is not visible in FIG. 4) will be aligned with each other. In other words, the holes along the upper line 21 are repositioned and aligned with the holes in the lower line 20 when the frame structure 3' has assumed its final, assembled condition. In this condition, the upper web section 6a has been displaced downwards and forward with reference to the longitudinal direction of the vehicle. Since all the holes in the upper web section 6a are aligned with corresponding holes in the lower web section 6b, the first frame member 4 can be fixed in this condition by suitable fastening elements, such as conventional locking bolts, which are inserted through one or more of these holes and locked with corresponding nuts. In FIG. 4, a bolt 25 and a corresponding nut 26 are shown in a schematic manner.

FIG. 4 is a perspective view of the first frame member 4 only. The second frame member 5 is treated in a corresponding manner, i.e. so that the holes 22 (see FIG. 3) along the two lines 23, 24 are aligned after a displacement of the upper web 9a of the second frame member 5. Also, in this condition, the upper web 9a of the second frame member 5 is preferably positioned on the outside of the lower web 9b.

Both frame members 4, 5 can be fixed by means of bolts arranged through one or more of the holes, said bolts being locked by suitable corresponding nuts. As an alternative, the holes can be used for fixing various components, brackets etc. extending between the first frame member 4 and the second frame member 5. Such components can consequently be fixed by means of bolts which additionally serve the purpose of joining the upper and lower web sections 6a, 6b, 9a, 9b of the first frame member 4 and the second frame member 5, respectively.

As regards the first frame member 4 shown in FIG. 4, the upper web section 6a is preferably positioned on the outside of the lower web section 6b. This is normally an advantage due to the fact that existing components being mounted between two conventional frame members can also be mounted between two frame members 4, 5 according to the invention, without any changes in dimensions. However, the invention is not limited to such an arrangement, which means that the upper web section 6a can alternatively be mounted on the inside of the lower web section 6b. It should be mentioned that the second frame member 5 is arranged in a manner which corresponds to the first frame member 4. In other words, the re-positioning of the upper web section 9a with reference to the lower web section 9b is generally the same for the second frame member 5 as for the first frame member 4.

Figure 5:
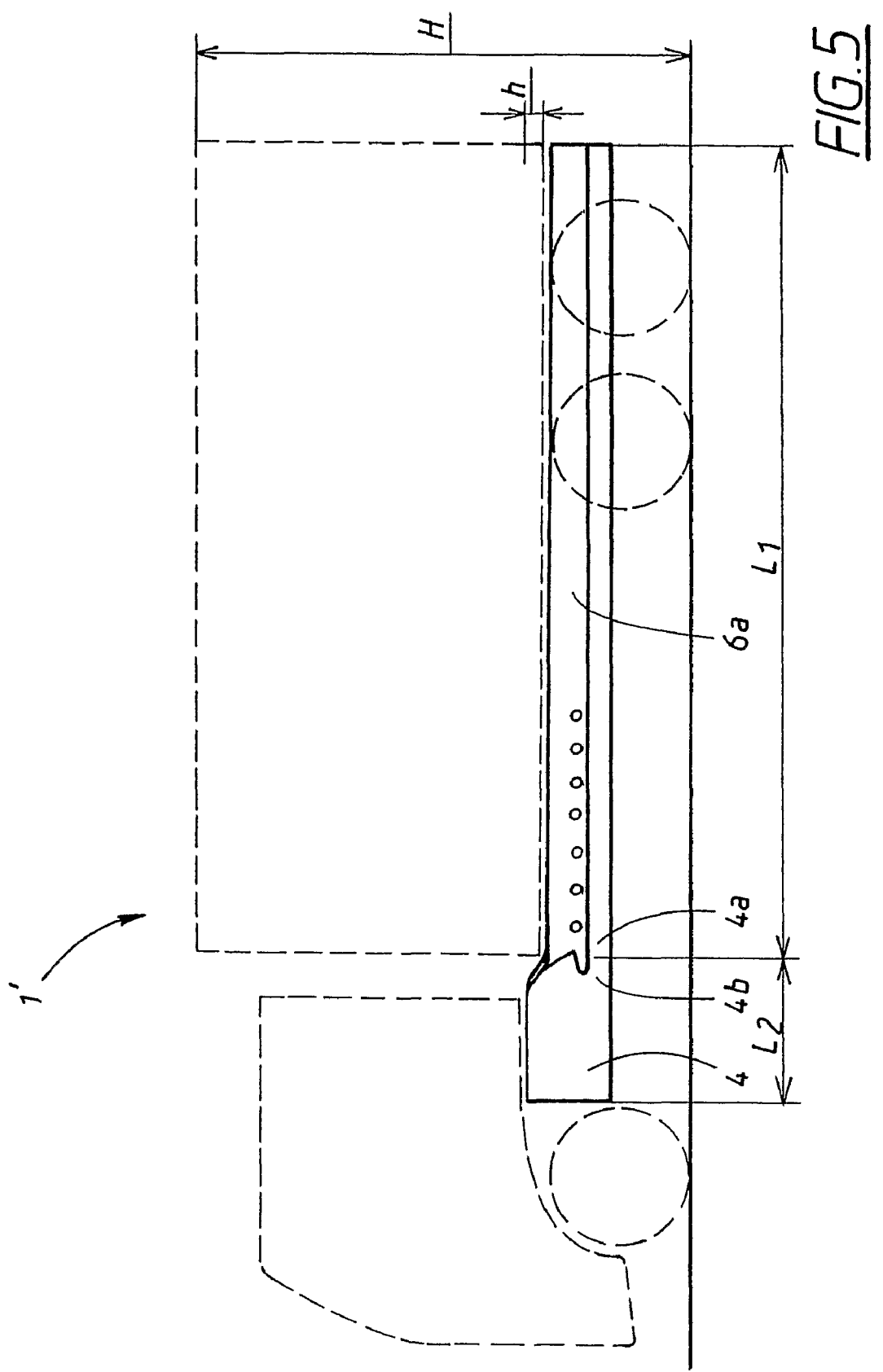
FIG. 5 is a view of a vehicle corresponding to FIG. 1, but in said second condition.

FIG. 5 is a simplified side view of a load-carrying vehicle 1' shown in its final condition, with the frame structure 3' being according to the invention assembled as described above. As shown in FIG. 5, a predetermined section 4a of the frame structure 3' has been modified so that each frame member 4, 5 is narrower along this section 4a, as compared with the remaining section 4b of the frame structure 3'. The length $L_1$ of this section generally corresponds to the length of the slits 12, 13. The remaining section 4b of the frame structure 3', i.e. having a certain length $L_2$, will remain with its original height.

In summary, the method of manufacturing the frame structure 3' according to the invention is based on the initial step that the above-mentioned slits 12, 13 are formed. After this step, the upper web sections 6a, 9a of the frame members 4, 5 are pressed downwards and in a direction towards the front of the vehicle 1'. This is a forced displacement of said upper web sections 6a, 9a, from an initial position to a second position wherein said predetermined section 4a of the frame structure 3' extends along a horizontal plane which is lower in said second position than in said initial position. In this manner, the holes 19 along the lines 20, 21 of the first frame member 4 and the holes 20 along the lines 23, 24 of the second frame member 5 are aligned. Next, the upper web sections 6a, 9a are fixed to the lower web sections 6b, 9b. At this stage, the bolts used for fixing can also be used for fixing additional components between the frame members 4, 5.

In normal cases, the frame structure 3' according to the invention can be lowered by a certain height h which preferably is between approximately 10-200 mm, as indicated in FIG. 5. This leads to an increase in the available cargo space. However, the invention is not limited to any particular dimensions. Also, the chosen height h may in turn give rise to changes in the dimensions of other parts of the frame structure 3', in order to fulfill the demands for strength of the frame structure 3'.

Assuming that the total height H of the vehicle is maximized, which often follows from legislation in different countries, this means that the present invention can be used to provide an increase of the available cargo space in the vehicle 1'. A further advantage of the invention is that the frame structure 3' is reinforced as a result of the above-mentioned arrangement of the frame members 4, 5.

The present invention is not limited to the above-mentioned embodiment, but can be varied within the scope of the appended claims. For example, the invention is suitable for different types of vehicles.

Furthermore, the frame structure according to the invention can be implemented with two or more levels of the frame members, i.e. in which the height of the frame member gradually decreases in steps along its length. This means that the slits in the frame members are formed with two or more pivot points for allowing such a re-positioning of the upper web section.

The invention claimed is:

1. A frame structure for a load-carrying vehicle and comprising at least one frame member extending generally in the longitudinal direction of the vehicle, the frame member being divided into an upper section and a lower section by means of a slit extending at least along a predetermined section of the frame member, wherein the slit is shaped so as to allow a forced displacement of the upper section to a position in which it extends generally parallel to the lower section and in a manner so that the frame member is narrower along a section generally corresponding to the length of the slit, as compared with the remaining section of the frame member, wherein the upper section comprises a first row of holes along an imaginary upper line and the lower section comprises a second row of holes along an imaginary lower line, with the forced displacement of the upper and lower sections being such that the holes in the first row are brought into alignment with the holes in the second row in order to enable fixation of the upper section and the lower section relative to each other by fastening elements in the aligned holes.

2. A frame structure according to claim 1, wherein the slit is associated with a cut-out section of the frame member which is shaped so as to define a pivot point for the forced displacement.

3. A frame structure according to claim 1, wherein the first and second rows of holes are offset so as to allow alignment of the holes after the forced displacement.

4. A frame structure according to claim 1, wherein the upper section is positioned on an outside of the lower section after the forced displacement.

5. A frame structure according to claim 1, comprising two frame members in a form of U-beams, each of the frame members having an upper flange, a web and a lower flange.

6. A method for manufacturing a frame structure for a load-carrying vehicle comprising:
   providing at least one frame member extending generally in a longitudinal direction of the vehicle,
   dividing the frame member into an upper section and a lower section by means of a slit extending at least along a predetermined section of the frame member,
   shaping the slit and providing a forced displacement of the upper section in a manner so that the upper section assumes a position in which it extends generally parallel to the lower section and in a manner so that the frame member is narrower along a section generally corresponding to the length of the slit, as compared with a remaining section of the frame member, providing the upper section with a first row of holes along an imaginary upper line and providing the lower section with a second row of holes along an imaginary lower line, displacing the upper and lower sections so that the holes in the first row are brought into alignment with the holes in the second row in order to enable fixation of the upper section and the lower section relative to each other by fastening elements in the aligned holes.

7. A method according to claim 6, wherein the slit is formed by plasma cutting.

8. A method according to claim 6, wherein the forced displacement is carried out by pivoting the upper section about a cut-out section of the frame member which is associated with the slit and which is shaped so as to define a pivot point during the displacement.

9. A method according to claim 6, comprising positioning the upper section on an outside of the lower section after the forced displacement.

* * * * *

UNITED STATES PATENT AND TRADEMARK OFFICE
CERTIFICATE OF CORRECTION

| | | |
|---|---|---|
| PATENT NO. | : 7,806,438 B2 | Page 1 of 1 |
| APPLICATION NO. | : 12/094062 | |
| DATED | : October 5, 2010 | |
| INVENTOR(S) | : Goran Levin et al. | |

It is certified that error appears in the above-identified patent and that said Letters Patent is hereby corrected as shown below:

Title Page, item (86), replace "PCT/SE2006/011269" with --PCT/SE2006/001268--.

Signed and Sealed this

Sixteenth Day of November, 2010

David J. Kappos
*Director of the United States Patent and Trademark Office*